United States Patent
Wang et al.

(10) Patent No.: US 10,331,973 B2
(45) Date of Patent: Jun. 25, 2019

(54) SYSTEM AND METHOD FOR DEPLOYING GRAPHICAL DIAGRAM TOPOLOGIES

(71) Applicant: Nicira, Inc., Palo Alto, CA (US)

(72) Inventors: Yong Wang, Sunnyvale, CA (US); Jayant Jain, Palo Alto, CA (US); Ly Loi, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 80 days.

(21) Appl. No.: 15/633,112

(22) Filed: Jun. 26, 2017

(65) Prior Publication Data

US 2018/0373961 A1 Dec. 27, 2018

(51) Int. Cl.
| | |
|---|---|
| *G06K 9/00* | (2006.01) |
| *G06K 9/62* | (2006.01) |
| *G06F 8/60* | (2018.01) |
| *H04L 12/24* | (2006.01) |
| *G06N 20/00* | (2019.01) |

(52) U.S. Cl.
CPC ............ *G06K 9/6253* (2013.01); *G06F 8/60* (2013.01); *G06N 20/00* (2019.01); *H04L 41/0893* (2013.01); *H04L 41/145* (2013.01)

(58) Field of Classification Search
None
See application file for complete search history.

(56) References Cited

U.S. PATENT DOCUMENTS

| | | | | |
|---|---|---|---|---|
| 6,014,503 | A * | 1/2000 | Nagata | G06F 17/5004 700/182 |
| 7,962,590 | B1 * | 6/2011 | Or | G06F 8/24 709/223 |
| 9,934,431 | B2 * | 4/2018 | Prebble | G06K 9/00456 |
| 2007/0156860 | A1 * | 7/2007 | Nedelcu | H04L 41/12 709/220 |
| 2011/0161952 | A1 * | 6/2011 | Poddar | G06F 17/30247 717/173 |
| 2014/0313216 | A1 * | 10/2014 | Steingrimsson | G06K 9/00402 345/589 |
| 2015/0370445 | A1 * | 12/2015 | Wang | G06F 17/30896 715/765 |
| 2015/0370538 | A1 * | 12/2015 | Wang | G06F 8/34 717/105 |

(Continued)

*Primary Examiner* — Hadi Akhavannik
(74) *Attorney, Agent, or Firm* — Patterson + Sheridan, LLP

(57) ABSTRACT

Techniques disclosed herein provide an approach for automatically importing graphical topologies and deploying the same. In one embodiment, a topology importer tool uses a trained machine learning model to detect and classify objects in an image depicting a topology. The topology importer distinguishes between software (or hardware) components in the detected objects and properties of those components. In particular, the topology importer may determine a property is associated with a component based on an overlap between objects representing the property and the component, a distance between the objects representing the property and the component, or a learned model. The topology importer determines relationships between components in a similar manner, as well as based on detected links represented by objects between components indicating those components are connected. The topology importer further converts the topology to a format understood by an application which may then deploy the topology.

20 Claims, 5 Drawing Sheets

(56) References Cited

U.S. PATENT DOCUMENTS

| | | | |
|---|---|---|---|
| 2016/0254943 A1* | 9/2016 | Maes | H04L 41/0893 709/224 |
| 2016/0254965 A1* | 9/2016 | Maes | H04L 67/10 709/223 |
| 2017/0039193 A1* | 2/2017 | Mustafi | G06F 17/2881 |
| 2017/0068844 A1* | 3/2017 | Friedland | G06K 9/00973 |
| 2017/0286799 A1* | 10/2017 | Gujar | G06K 9/4671 |

* cited by examiner

SYSTEM AND METHOD FOR DEPLOYING GRAPHICAL DIAGRAM TOPOLOGIES

BACKGROUND

Graphical diagrams (e.g., hand-drawn sketches or diagrams, computer aided sketches or diagrams, etc.) are a natural way of expressing ideas. For example, software developers often draw diagrams (e.g., by hand, or using a computer aided sketching or diagramming program) to represent ideas and design new models. One type of diagram that developers draw is a topology diagram depicting computing system components and their arrangement/relationships. For example, a developer may draw a topology diagram representing a logical topology for a logical network. Such topologies might be designed in, e.g., hand-drawn diagrams on paper or on a white board, or in computer based diagrams or images. However, deployment of topologies after they are drawn has traditionally required manual user input into a graphical user interface (UI) or using an application programming interface (API), which can be tedious and error prone.

SUMMARY

One embodiment provides a method for automatically deploying a topology in a system. The method generally includes receiving an image depicting the topology, and parsing the received image using one or more machine learning models which output object classifications and locations within the image. The method further includes identifying, based on at least the object classifications and locations, at least one of software or hardware components in the topology, one or more properties of the components, and one or more relationships between the components. In addition, the method includes creating instances of the identified components with the identified properties and relationships.

Further embodiments include a non-transitory computer-readable storage medium storing instructions that when executed by a computer system cause the computer system to perform the method set forth above, and a computer system programmed to carry out the method set forth above.

DETAILED DESCRIPTION

Figure 1:
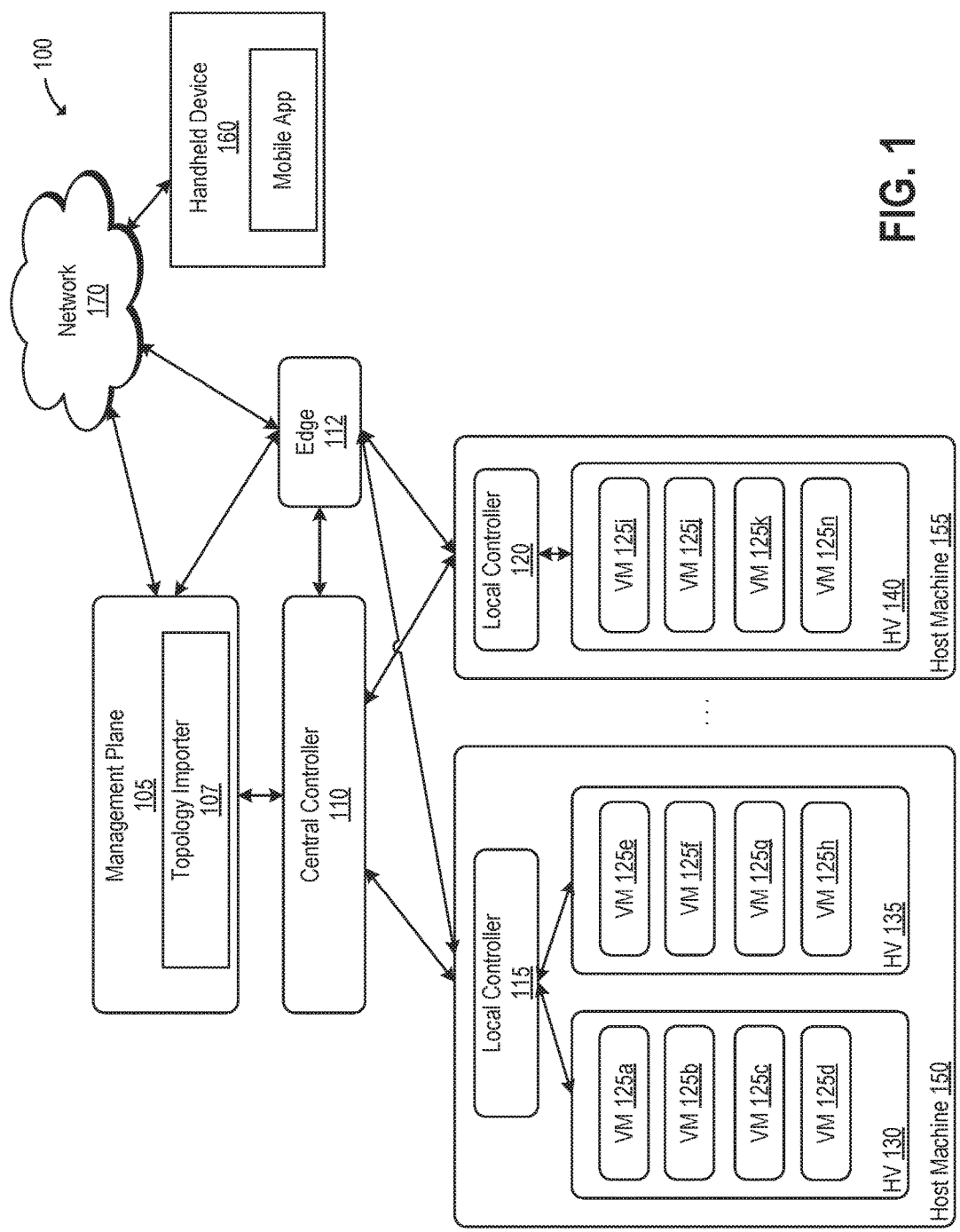
FIG. 1 depicts a simplified block diagram of a system in which an embodiment may be implemented.

Embodiments presented herein provide techniques for automatically importing graphical topologies (e.g., as an image) and deploying the same. As used herein, "topology" refers to a design of components and their relationships in a computing system. For example, a topology may specify a software-defined network which includes logical routers, logical switches, and virtual middleboxes that provide network functions such as network address translation (NAT), firewall, load balancing, and virtual private networks (VPN), as well as properties of and connections between such components of the software-defined network. Other examples of topologies include those specifying virtualized infrastructures comprising virtual machines (VMs) or other virtual computing instances (e.g., containers), computer servers, storage networks and arrays, and networks that are grouped into clusters and pools of resources, as well as hierarchies of inventory objects and/or relationships between entities in a virtualized computing system. In one embodiment, a topology importer is configured to use a trained machine learning model, such as a deep learning model or deformable parts model, to classify and localize objects (e.g., squares, circles, dots, lines, text, etc., or a combination of these) representing topology components and properties of components in an image depicting a graphical topology. As used herein, "classify" refers to predicting a label for an object from a number of predefined labels, and "localize" refers to determining a location of an object. The topology importer identifies components (e.g., virtual ports) represented by detected objects and properties of those components (e.g., IP addresses assigned to the virtual ports) represented by other detected objects. As used herein, a property refers to any attribute or configuration of a software (or hardware) component. For example, properties of a logical router may include services enabled on the router (e.g., load balancing, VPN, firewall) and associated configurations (e.g., IP address, NAT translated IP pool, Internet Protocol Security (IPSec) VPN protected subnets, etc.) of the services or the logical router itself. Having identified the components and properties based on the detected objects, the topology importer further determines that a property is associated with a component based on an overlap between the object representing the property and the object representing the component's detected locations, a distance between the object representing the property and the object representing the component, or a learned model such as a model providing the probability that the property is associated with the component given their representative objects' relative locations. In addition, the topology importer determines relationships between identified components in a similar manner based on overlapping locations of their representative objects (e.g., a port object overlaid on a virtual switch object may be identified as a virtual port of the virtual switch), distance, or a learned model, as well as based on identified links between objects representing components indicating that those components are connected to each other. The topology importer may further generate user interface(s) (UI(s)) that permit the user to revise the identified topology (e.g., to correct any misidentifications) and to fill in missing information necessary to actually deploy the topology. The topology importer may then convert the revised topology (and other necessary information, if any), including the topology's components and their associated properties and relationships, to a format (e.g., JavaScript Object Notation (JSON) or protobuf) that is understood by a deployment application which creates the components of the topology, with the appropriate properties and relationships.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

FIG. 1 depicts a simplified block diagram of a system in which an embodiment may be implemented. As shown, system 100 includes a management plane 105, a central controller 110, an edge 112, and multiple local controllers (also called the local control plane (LCP)) 115 and 120 that operate on host machines 150-155. Host machines 150-155 are physical computing devices that support execution of VMs or other virtualized computing instances (e.g., containers). Each of host machines 150-155 runs a hypervisor 130-140 capable of creating and managing multiple virtual machines 125a-125n on host machines 150-155.

Hypervisors 130-140 are virtualization software that abstract processor, memory, storage, and/or networking resources (not shown) into multiple virtual machines (e.g., VMs 125a-125n) that can run side-by-side on the same host machines 150-155. That is, the virtualization software partitions physical host machines 150-155 into multiple secure and portable virtual machines that run on the same physical servers. Each virtual machine represents a complete virtual system—with virtual processors, virtual memory, virtual networking interface, virtual disk storage, and its own BIOS. The virtualization software performs system resource management and VM resource emulation. VM resource emulation may be performed by a virtual machine monitor (VMM) component (not shown). In some implementations, each VM may have a corresponding VMM instance. Depending on implementation, the virtualization software may be unhosted or hosted. Unhosted virtualization software generally relies on a specialized virtualization kernel for managing system resources, whereas hosted virtualization software relies on a commodity operating system—the "hosting operating system"—such as Windows, Mac OS X, or Linux to manage system resources. While not illustrated, each VM 125a-125n may include a software-based virtual network adapter (e.g., a virtual network interface card (VNIC)) that is logically connected to a physical network adapter (e.g., local controllers 115-120) included in host machines 150-155 that provides network access for the virtual machine. The virtual network adapter is typically connected to the physical network adapter through a virtual switch that may serve as a physical network switch, i.e., serve as an edge device on the physical network, but implemented in software.

Though each is shown as a single entity, management plane 105 and central controller 110 may actually be implemented as distributed or clustered systems. That is, management plane 105 may include multiple software components, running in one or more computing devices or virtual machines or containers (or other logical computing instances), that together implement management plane functions, and a central control plane may include multiple software components running in multiple central controller computers or virtual machines or containers (or other logical compute instances) that implement central control plane functions. In some embodiments, each centralized controller includes both management plane and central control plane functions (e.g., as separate applications or functions).

Edge 112 is a transport node that provides network edge security and gateway services to isolate the virtualized network. Illustratively, traffic from host machines 150-155 can reach an external network 170 (e.g., the Internet) through edge 112, and traffic from the external network 170 can reach host machines 150-155 through edge 112. In one embodiment, centralized services such as network address translation (NAT), firewall, load balancing, VPN, dynamic routing, Dynamic Host Configuration Protocol (DHCP), and the like can be implemented on edge 112. In a particular embodiment, edge 112 may be an NSX® Edge, which can be deployed in, e.g., a demilitarized zone (DMZ), VPN extranets, or to create virtual boundaries between clients in a multi-tenant cloud environment. Although shown as a gateway to reach external network 170, it should be understood that logical edge devices may also be deployed in other ways, such as in host clusters.

In one embodiment, management plane 105 is responsible for receiving logical network configuration inputs, such as through an application programming interface (API). Traditionally, users (e.g., network administrators) manually input logical network configuration information through, e.g., a command-line interface, a graphical user interface, or the like to create software-based networks. Management plane 105 may further generate desired state data that specifies how a logical network should be implemented in the physical infrastructure based on logical network configuration input. In some embodiments, this data includes description of the logical forwarding elements (e.g., logical switches, logical routers, etc.) and logical ports in a uniform format (e.g., as a set of database records or another format). The central controller 110 then updates/implements logical networks based on state information pushed to it from management plane 105. In particular, central controller 110 may compute ephemeral runtime states based on configuration from the management plane and disseminate information reported by elements in the data plane via the local control plane. The local control plane, represented by the local controllers 115 and 120, monitors local link status, computes ephemeral runtime states based on updates from the data plane and central controller 110, and pushes stateless configuration to forwarding engines.

Illustratively, management plane 105 includes a topology importer module 107. Although shown as part of management plane 105, it should be understood that topology importer 107 may be implemented differently in alternative embodiments, e.g., as an application running elsewhere in the data center, as a mobile device application that generates output consumed by management plane 105, etc. Topology importer 107 is configured to process received images of topologies, also referred to herein as importing the topologies. The received images may include, e.g., images of graphical topologies captured via a camera of a mobile device 160 and transmitted to topology importer 107 over network 170, scanned images, other computer based images, and the like. In one embodiment, topology importer 107 is configured to employ machine learning model(s) to classify and localize objects depicted in received images; to identify topology components, properties, and relationships from the classified objects and their locations; to generate UI(s) permitting a user to revise the identified topology and to fill in missing information necessary to deploy the topology; and to export the topology (and other necessary information, if any) with the identified components, properties, and relationships to a format (e.g., a JSON or protobuf file) that can be understood by another application responsible for actually deploying the topology.

Figure 2:
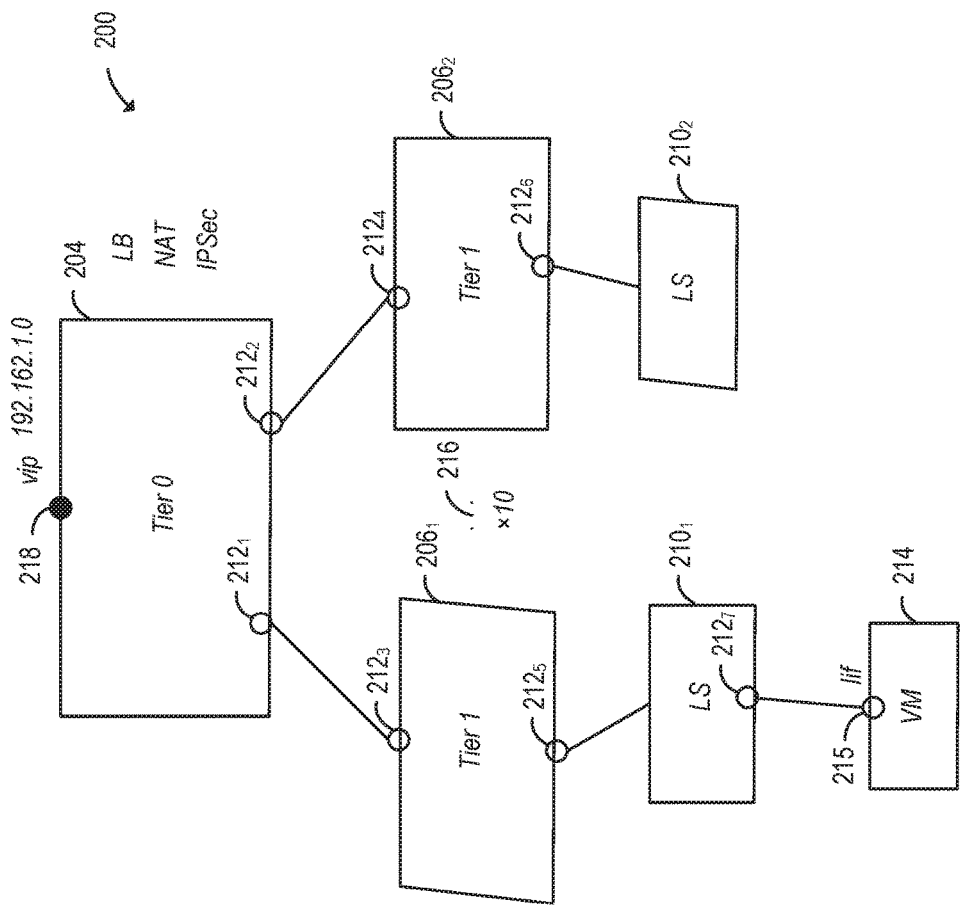
FIG. 2 illustrates an example graphical topology, according to an embodiment.

FIG. 2 illustrates an example graphical topology 200, according to an embodiment. As shown, graphical topology 200 is a topology of a software-defined network. Software-defined networks may have multi-tier architectures with different transport nodes connected to provide overlay logical networking functions. It is often helpful to diagram how these pieces are connected together in order to understand how data flows between components of the software-defined networks such as logical routers, logical switches, and virtual middleboxes providing NAT, firewall, load balancing, VPN, and the like. Illustratively, graphical topology 200 is a topology of a software-defined network that includes a tier 0 logical router 204, tier 1 logical routers $206_{1-2}$, logical switches $210_{1-2}$, ports $212_{1-7}$, a VM 214 with a logical interface 215, and an ellipses 216 and the text "×10." In a particular embodiment, graphical topology 200 may represent a logical network created and managed using a software-defined network (SDN) implementation, such as the NSX® platform commercially available from VMware, Inc. of Palo Alto, Calif.

A logical router in an SDN deployment is a router that resides in a logical overlay network, and may be implemented using distributed or centralized router software components, typically executing on edge server devices in the context of a compute virtualization hypervisor. Each of tier 0 logical router 204 and tier 1 logical routers $206_{1-2}$ may include one or more routing instances and routing tables, and logical routers can be used to create multiple routing domains within a single physical router, thereby maximizing usage of router hardware. In one embodiment, tier 0 router 204 is controlled by a cloud service provider and provides North-South connectivity allowing endpoints in the virtual network to access public networks, while tier 1 routers $206_{1-2}$ are each controlled by a cloud tenant and provide East-West connectivity between the same tenant's networks.

Logical switches $210_{1-2}$ provide Layer 2 (L2) switched connectivity across host computers with Layer 3 (L3) internet protocol (IP) reachability between them. In one embodiment, logical switches $210_{1-2}$ are each mapped to a respective Virtual Extensible LAN (VXLAN) that allows an L2 network to be tunneled over a physical L3 network through MAC Address-in-User Datagram Protocol (MAC-in-UDP) encapsulation of the L2 frames. In particular, logical switches $210_{1-2}$ can provide isolated L2 networks that allow cloud tenants to be isolated from each other. Of course, other network virtualization protocols such as STT, NVGRE, Geneve, etc., may be used in place of VXLAN.

In topology 200, VM 214 is connected to a virtual port $212_7$ of logical switch $210_1$, with the connection being represented by the line between VM 214, a circle overlaid on logical switch $210_1$ representing virtual port $212_7$ in graphical topology 200, and another circle overlaid on VM 214 along with the letters "lif" representing the logical interface of VM 214, which may be the VM's VNIC. Similarly, links connecting logical switches $210_{1-2}$ and tier 1 logical routers $206_{1-2}$ and connecting tier 1 logical routers $206_{1-2}$ and tier 0 logical router 204, and the associated ports, are shown with lines and circles, respectively.

As shown, a filled-in circle 218 is overlaid on tier 0 logical router 204 in topology 200, next to the letters "vip" and the IP address "192.168.1.0." Filled-in circle 218 is representative of a logical router port that connects tier 0 logical router 204 to an external network (e.g., a public network), and the letters "vip" and the IP address "192.168.1.0" indicate that this logical router port has been assigned the virtual IP address 192.168.1.0. It should be understood that external endpoints will send traffic to this exposed virtual IP address.

As shown, the text "LB," "NAT," and "IPsec" appear adjacent to tier 0 router 204 in topology 200. "LB," "NAT," and "IPSec" represent load balancing, network address translation, and Internet Protocol Security, respectively, which are virtual middlebox services that can be enabled on tier 0 router 204. As described, such services enabled on a logical router and associated configurations (e.g., IP address, NAT translated IP pool, Internet Protocol Security (IPSec)

VPN protected subnets, etc.) of the services or the logical router itself may be considered properties of the logical router. Of course, some of the associated configurations may also be considered properties of properties of the logical router and may also be identified as such in a similar manner as identifying properties of components. It should be also understood that service configurations do not need to be included in the graphical topology, as service binding can be done, e.g., after the topology is deployed.

In one embodiment, a load balancer may be implemented as a virtual application that listens on a virtual IP address for incoming requests and distributes the requests across multiple backend servers. Tier 0 logical router 204 may perform NATing to, e.g., change the source IP address of outgoing packets from the IP addresses of the backend servers to the virtual IP address and to change the destination IP address of incoming packets from the virtual IP address to the IP address of the load balancer virtual appliance, among other things. IPSec VPN is a service that may be enabled on tier 0 router 204 to support site-to-site IPSec VPNs that provide secure connections between tier 0 router 204 and remote sites. Other types of services may include firewalls, dynamic host configuration protocol (DHCP), security groups, and the like.

Figure 3:
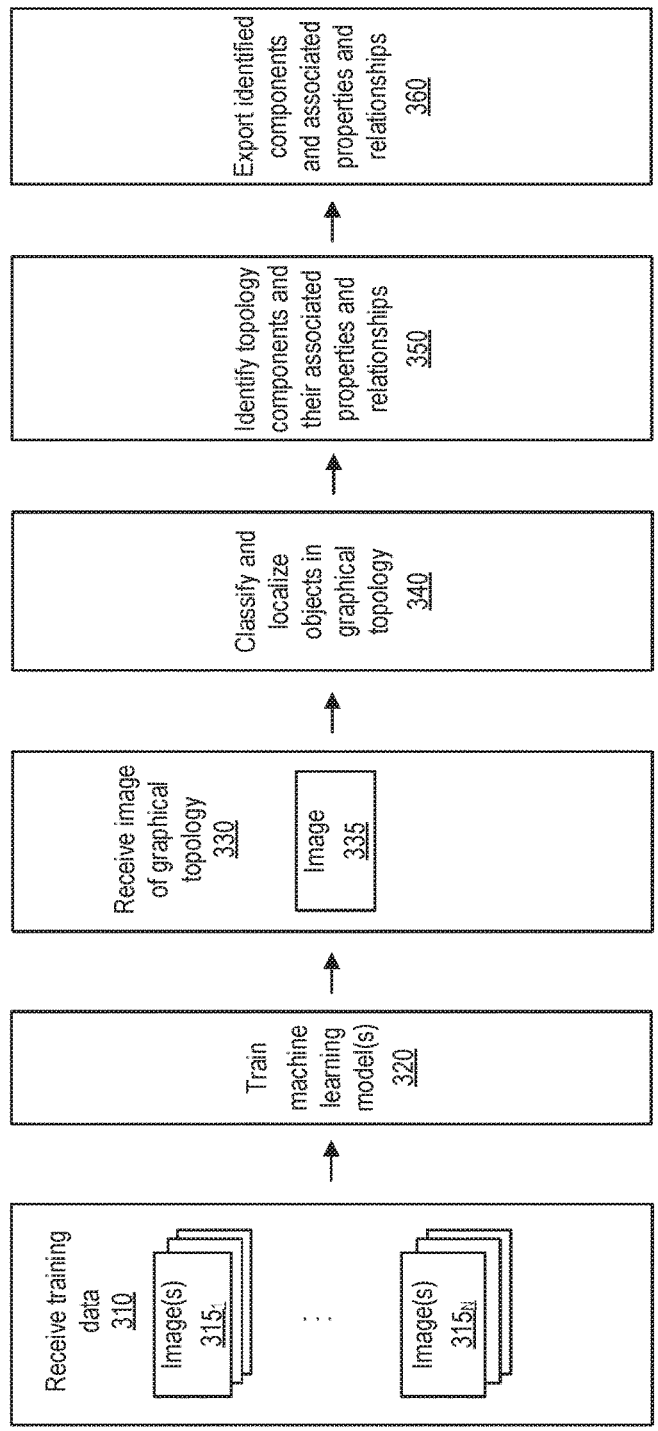
FIG. 3 illustrates an approach for training a machine learning model and realizing a graphical topology, according to an embodiment.
Figure 4:
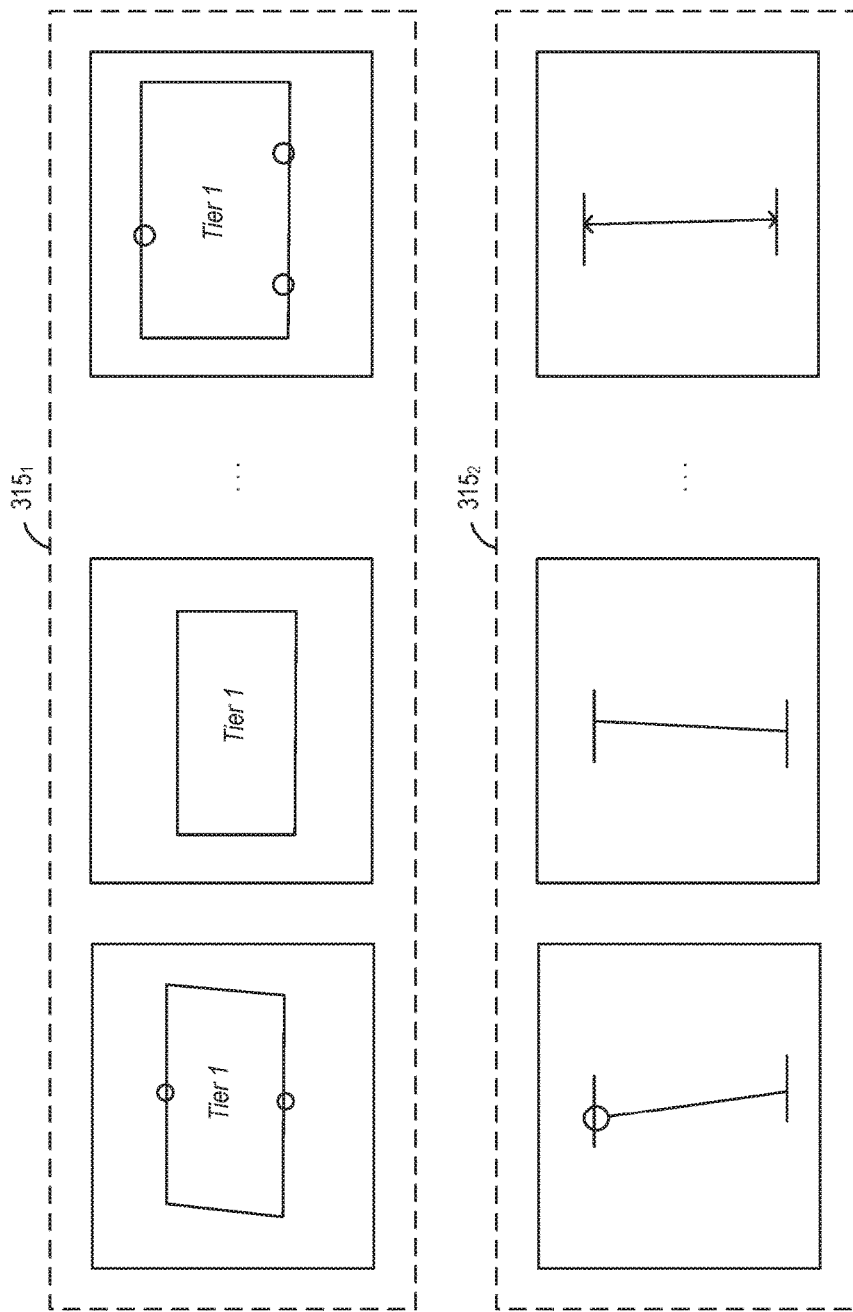
FIG. 4 illustrates examples of training data used to train a machine learning model, according to an embodiment.

FIG. 3 illustrates an approach for training a machine learning model and realizing a graphical topology such as topology 200, according to an embodiment. As shown, training data including image sets $315_{1-N}$ is received at 310. In one embodiment, the training data includes (e.g., manually prepared) sets of images depicting different object types that the machine learning model is being trained to classify and localize. FIG. 4 illustrates examples of training data including a set of images $315_1$ depicting graphical tier 1 routers and another set of images $315_2$ depicting graphical links, which represent connections between components of a logical network topology. Such image sets $315_1$ and $315_2$ may be used to train a machine learning model to recognize tier 1 routers and links, respectively, in graphical topologies.

In one embodiment, the training data image sets may depict lines (that may combine to form shapes in some cases) and/or text, and each of the image sets may be used to train the machine learning model to recognize a respective component or property, or a character. For example, image set $315_1$ that is used to train the machine learning model to identify tier 1 routers includes images depicting rectangles with the text "Tier 1" inside, and some of the images in image set $315_1$ also depict ports inside the rectangles. These images are not identical, but they each depict a tier 1 router as it might be drawn in a topology. For example, the images in image set $315_1$ may be from actual graphical topologies. As another example, a set of images depicting handwritten text "LB" may be used to train the machine learning model to identify load balancers. As yet another example, a training image set may depict graphical ellipses such as ellipses 216, which can be considered a property indicating that an associated component needs to be created multiple times.

The machine learning model or another machine learning model may be trained in a similar manner (e.g., with image sets depicting respective characters) to identify individual characters so that characters that appear together may be analyzed. For example, the characters may be processed to identify the words "tier" and "1" or "LB," or parts of words or other character strings, such as IP addresses and ellipses 216 and "×10", that have known meanings. As described in greater detail below, text with known meanings can be used, alone or in conjunction with other detections made by the machine learning model, to identify components and properties in graphical topologies, among other things.

At 320, a machine learning model is trained using the training data image sets. The machine learning model may include any feasible model that takes as input images and outputs classifications of objects and locations of those objects in the images. Examples of such machine learning models include deep learning models such as convolution neural networks and region proposal networks, deformable parts models, or some combination of these models. Any appropriate supervised training algorithm may be used, such as a backpropagation algorithm, to train the machine learning model. Although training of a single machine learning model is shown, it should be understood that multiple machine learning models may be used in some embodiments. As described, one or more machine learning models may be trained using image sets depicting components of a topology and associated properties, as well as image sets depicting characters that may form text representing such components or properties.

At 330, topology importer 107 receives an image of a topology subsequent to the training of the machine learning model. For example, the received image may be an image taken using a mobile device and depict a whiteboard with a graphical topology drawn on it. Such mobile device images may be uploaded to topology importer 107 via a network (e.g., the Internet).

At 340, topology importer 107 inputs the image of the graphical topology received at 330 into the machine learning model trained at 320 to obtain classifications and locations of objects in the image. In one embodiment, the machine learning model may output classifications of objects that it has been trained to detect as particular components or properties, as well as characters that it has been trained to detect. In addition, the machine learning model outputs the locations of the detected objects, e.g., in the form of bounding boxes. In some embodiments, images may also be preprocessed prior to being input into the machine learning model(s) (and to being used as training data), e.g., by removing noise from the images or converting the images to black and white.

At 350, topology importer 107 identifies components and their associated properties and relationships based on the output of the machine learning model. As described, the machine learning model may already classify some objects as particular components or properties at 340. In such cases, topology importer 107 may simply use these same classifications when identifying components and properties. In other cases where the classification by the machine learning model is not a known component (or property), topology importer 107 may use characters (or even shapes) detected by the machine learning model to identify components or to confirm or correct the classifications of components output by the machine learning model. For example, the "Tier 0" text in graphical topology 200 represents a tier 0 router component, and topology importer 107 may identify such a tier 0 router from the "Tier 0" characters that appear together and are output by the machine learning model using a stored mapping (e.g., in a database) between "Tier 0" and tier 0 router. Such an identification of "Tier 0" as a tier 0 router may be used to confirm an identification by the machine learning model or to supplement the classifications made by the machine learning model if, e.g., the machine learning model is unable to classify a box with "Tier 0" inside as a tier 0 router. In another embodiment, topology importer 107 may identify some objects in part (or entirely) based on their locations relative to other objections. For example, a circle located in a logical router may be identified as a logical port while a circle located in a VM may be identified as a VNIC (or reclassified to a VNIC if the machine learning model initially classifies it as a logical port). Such identifications may be made using predefined rules specifying how to identify objects, or machine learning may be used to learn location relationships indicative of object identities that typically occur in graphical topologies.

In addition to identifying the components themselves, topology importer 107 is also configured to identify properties of those components as indicated by objects detected by the machine learning model. For example, the machine learning model may detect the text or characters in "LB" or in "IPSec" next to tier 0 router 204 in graphical topology 200. Similar to the description above of identifying "Tier 0" as a tier 0 router component, topology importer 107 may identify what "LB" or "IPSec" represents based on the machine learning model's classification of "LB" as load balancer, "IPSec" as IPSec, and/or a separate mapping of the characters forming "LB" to load balancer or "IPSec" to IPSec. As described, load balancer and IPSec are properties that may be enabled on tier 0 router 204, and topology importer 107 may identify them as such. In one embodiment, topology importer 107 identifies properties surrounding components as being associated with those components, such as the load balancer and IPSec enabled on tier 0 router 204, based on location, overlap, and/or distance. In such a case, properties represented by objects whose locations (e.g., bounding boxes), as detected by the machine learning model, overlap with locations (e.g., bounding boxes) of objects representing components are associated with those components if the components are capable of having such properties. For other properties represented by objects whose locations do not overlap with locations of object representing components, topology importer 107 may associate the property with a closest (e.g., the least distance between centers of object bounding boxes) component that is capable of having such a property. For example, "LB" and "IPSec" may be associated with tier 0 router 204 as properties to be enabled on the router 204, as tier 0 router 204 is the component depicted closest in graphical topology 200 to the "LB" and "IPSec" texts and on which a load balancer and IPSec can be enabled. In addition to such services as the load balancer and IPSec being enabled as properties of a logical router, other properties may include other configurations of the logical router or configurations of the enabled services, which may be identified as properties of the services and/or the logical router in a similar fashion based on overlapping locations of corresponding objects, distance between the objects, or a learned location relationship. As another example, the IP address "192.168.1.0" and text "vip" may be identified as a virtual IP address assigned to logical router port 218, as logical router port 218 is the closest depicted component in graphical topology 200 which can have a virtual IP address assigned to it. As yet another example, ellipses 216 and the text "×10" may be associated with tier 1 router $206_1$, which ellipses 216 and "×10" are next to in graphical topology 200, as the ellipses 216 and "×10" indicate that multiple (specifically, 10) tier 1 routers should be created.

In other embodiments, machine learning may be used to associate properties with components based on how components and their associated properties are typically drawn in topologies. For example, probabilistic programming may be employed to learn the probability that properties are associated with components given the locations (or distance) of their object representations relative to each other, and topology importer 107 may use such a Bayesian model to associate a given property with a component with the highest probability if the component is capable of having such a property. Other supervised machine learning approaches may be used as well, such as deep learning (e.g., an artificial neural network trained with a backpropagation algorithm). As an example, ellipses may typically be drawn to the right of a software or hardware component to be created multiple times, and machine learning may be used to learn this relationship so that ellipses that are identified are associated with components depicted to their left.

In addition to identifying components and their associated properties, topology importer 107 is further configured to identify relationships between the components. Such relationships may generally be represented in graphical topologies in various ways, including as a line or arrow representing a connection between objects or an object overlaid on another object. In one embodiment, topology importer 107 identifies objects overlaid on other objects, according to the locations output by the machine learning model, as belonging to the other objects, and topology importer 107 may further identify links represented by objects whose locations are directly between other objects representing components as connecting those components. For example, the machine learning model may output a classification of the line between tier 1 router $206_1$ and logical switch $210_1$ as a network link and the circle overlaid on tier 1 router $206_1$ as a port, as well as the locations of the objects representing the link and the port. In turn, topology importer 107 may identify that logical switch $210_1$ is connected to tier 1 router $206_1$ via the identified port and that the port belongs to the router based on (1) the identified link's depicted location (e.g., bounding box) between the depicted locations of logical switch $210_1$ and the port, and (2) an overlap between the depicted locations (e.g., the bounding boxes) of the port and tier 1 router $206_1$, respectively.

At 360, topology importer 107 exports the identified components and their associated properties and relationships. For example, topology importer 107 may generate a JSON or protobuf format file that lists the identified components, properties, and relationships. Such an exported file may then be imported by, e.g., another management plane 105 module which parses the file and creates the identified components with the identified properties, connects the appropriate components, and enables services, as specified in the exported file. For example, the management plane 105 module may map each of the components, properties, and relationships specified in the exported file to one or more API calls, which a user might otherwise initiate manually, based on stored mappings, and then make those API calls. That is, the management plane 105 module resolves the dependencies between components and issues API calls (which might not be a 1:1 mapping) to push the logical topology configuration to central controller 110 and eventually to the data path. It is assumed here that the exported file is in a format that the management plane 105 module responsible for deploying the topology understands.

In another embodiment, either topology importer 107 or another application may generate UI(s) that show the identified topology and permit a user to change elements of the topology, as well as to fill in any required information (e.g., components, properties, and/or relationships) that is missing from the topology, with the revised topology (and other necessary information, if any) then being exported or used to update a previously exported topology. For example, the identified topology may be converted to a standard display format showing the topology, including components and their associated properties and relationships, and the user may interact with this UI to confirm the identified topology or add, delete, or modify the topology. In a further embodiment, such user feedback and the image of the topology may be used to re-train the machine learning model (e.g., through reinforcement learning), thereby improving the accuracy of the machine learning model. In addition to editing the identified topology itself, UI(s) such as a wizard or other type of interactive walk-through may also be generated with some information automatically populated based on the identified (and user-confirmed) topology and missing fields corresponding to other information necessary to deploy the topology that has not been identified from the graphical topology, as described in greater detail below.

In yet another embodiment, the topology exported by topology importer 107 may be validated by, e.g., management plane 105 prior to deployment. For example, management plane 105 may, without actually creating components of the exported topology, walk through existing routing tables, verify IP addresses, etc. to determine whether the exported topology can be implemented. That is, management plane 105 may create a logical model that simulates the export topology and find anomalies, if any, to ensure no such anomalies exist and the topology can be deployed successfully. In certain embodiments, management plane 105 may further prompt a user to correct such anomalies, or may even automatically correct some such anomalies.

Figure 5:
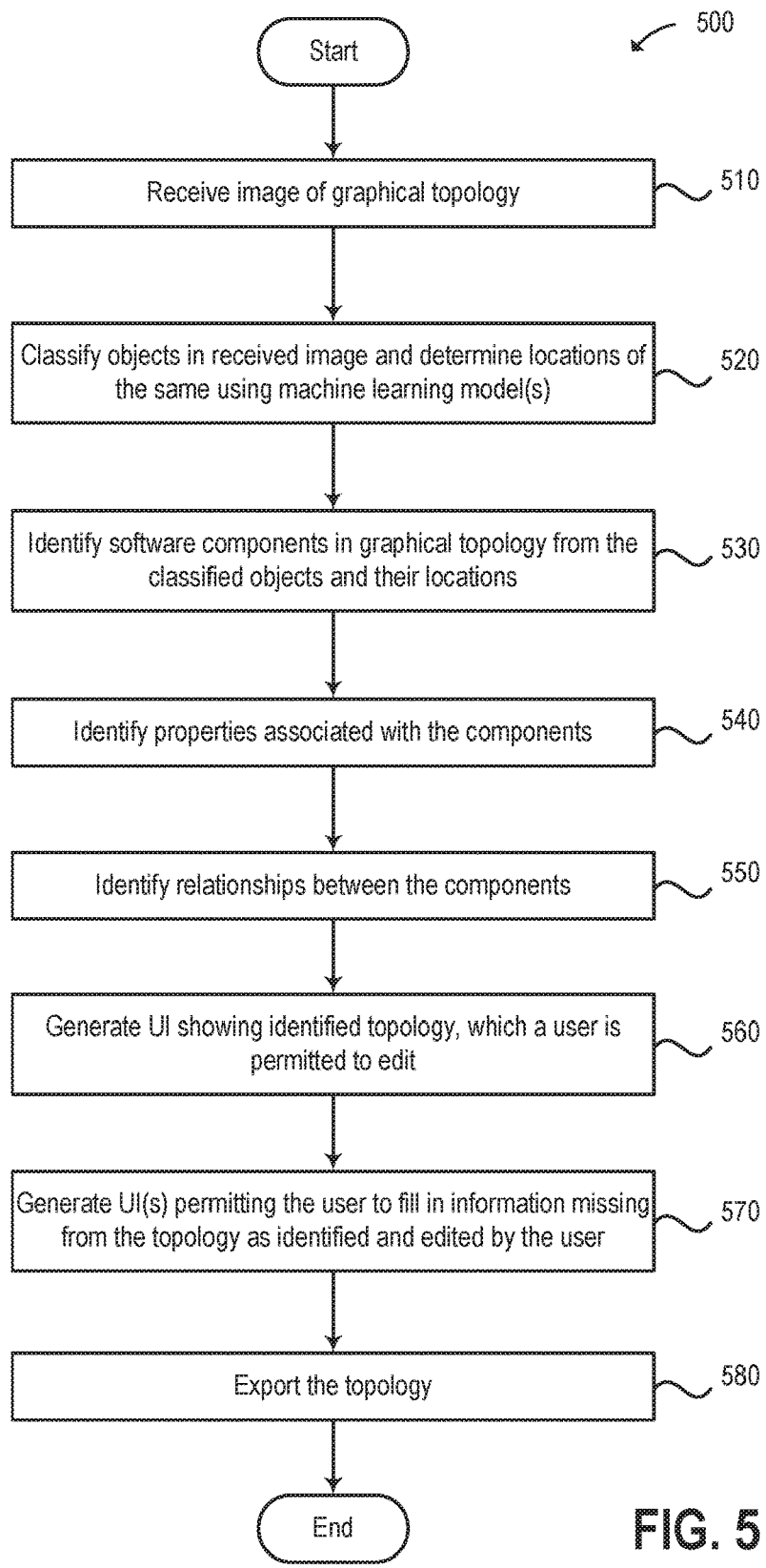
FIG. 5 illustrates a method for deploying a graphical topology depicted in an image, according to an embodiment.

FIG. 5 illustrates a method 500 for deploying a graphical topology depicted in an image, according to an embodiment. As shown, method 500 begins at step 510, where topology importer 107 receives the image of the graphical topology.

At step 520, topology importer 107 classifies objects in the received image and determines locations of the same using machine learning model(s). As described, one or more machine learning models, such as a convolutional neural network, a region proposal network, and/or a deformable parts model, may be trained to classify and localize components and properties, as well as characters, using training data that includes sets of images depicting the components, properties, and characters. Subsequent to such training, topology importer 107 may input images of graphical topology into the machine learning model(s) to recover classifications and locations of components, properties, and characters that appear in the images. In some embodiments, images may also be preprocessed prior to being input into the machine learning model(s) (and to being used as training data).

At step 530, topology importer 107 identifies components in the graphical topology from the classified objects and their locations output by the machine learning model(s). As described, the classifications provided by the machine learning model(s) may be enough to identify some components, while topology importer 107 may use characters detected by the machine learning model(s) and stored mappings to identify components or to confirm or correct the machine learning model's classifications in other cases. In one embodiment, topology importer 107 may also make component identifications from objects in part (or entirely) based on the depicted locations of those objects relative to other objections using predefined or learned rules.

At step 540, topology importer 107 identifies properties associated with the components identified at step 530. In one embodiment, properties may be identified in a similar manner as components. Associations between identified properties and components may be determined based on, e.g., location overlap between objects representing the properties and components and distance between such objects or a learned model that is trained to identify common ways properties are represented relative to components in graphical topologies, as described above.

At step 550, topology importer 107 identifies relationships between the components identified at step 530. Similar to associations between properties and components, relationships between components may also be determined based on, e.g., location overlap between objects representing the components and distance between such objects or a learned model. For example, an identified port whose depicted location overlaps that of an identified logical router may be identified as a port of the logical router. In addition, identified links that are depicted directly between components may be used to identify connections between those components.

At step 560, topology importer 107 generates a UI showing the identified topology, including the components and their associated properties and relationships, that a user is permitted to edit via the UI. Displaying such a UI permits a user to confirm that the automatically identified topology is in fact what was drawn and to permit the user to make any desired changes to the topology, such as modifications or corrections to the topology. As described, such user feedback may also be used along with the graphical topology to re-train (e.g., through reinforcement learning) and thereby improve the machine learning model(s) used to classify objects and identify their locations.

At step 570, topology importer 107 further generates UI(s) that permit the user to fill in information missing from the topology as identified and edited by the user. It should be understood that graphical topologies drawn by hand or with computer-aided sketching or diagramming programs, even after the user-confirmation or editing at step 560, may not always include all of the components, properties, relationships, and/or other information needed to actually deploy the topologies. For example, a user may forget to include one or more necessary components. To remedy such a mistake, topology importer 107 may generate UI(s) asking the user to specify such missing components. In one embodiment, topology importer 107 may populate fields in a wizard or other type of interactive walk-through with some (or all) of the components, properties, and/or relationships identified from the graphical topology and confirmed by the user. The wizard or other interactive walk-through may also include other required fields, corresponding to missing information necessary to deploy the topology, that the user can fill in. That is, the wizard or other interactive walk-through may include fields that need to be filled in to deploy a topology, and some or all of those fields may be automatically populated based on information identified from the graphical topology (and confirmed by the user), with the remaining fields requiring manual input by the user to fill in information that is still missing.

At step 580, topology importer 107 exports the topology (and other necessary information, if any) to a format that management plane 105 understands, such as the JSON or protobuf format. In turn, another management plane 105 module may, upon receiving such exported information, deploy the topology by, e.g., mapping the components, properties, and relationships in the topology to API calls and making those API calls automatically. As described, in one embodiment, the exported topology may first be validated through simulation to ensure that the topology is correct prior to deployment.

Although discussed herein primarily with respect to examples of topologies with certain components such as the topologies of logical networks, it should be understood that techniques disclosed herein are equally applicable to recognizing and deploying topologies with other components. For example, techniques disclosed herein may be used to identify components of physical topologies, such as fabric nodes, host switches, interface information, and the like. It should be understood that physical topologies may generally vary from one deployment to another, and in one embodiment a virtual topology and an underlying physical topology may together form the full topology that the management plane can deploy. In such a case, topology importer 107 may be used to import one or both of the virtual and physical topologies from graphical topolog(ies) and to export such topologies for consumption by management plane 105 that deploys those topologies, and this process may also include, e.g., generating UI(s) that allow the user to confirm the identified physical topology and automatically populating fields in a wizard or other interactive walk-through, similar to the description above. A particular example of a graphical representation of such a physical topology may include host computers, network devices, and Virtual Extensible LAN (VXLAN) tunnel endpoints (VTEPs) in those hosts and network devices used to implement a VXLAN overlay network, among other things. As another example of a graphical topology other than a logical network topology, techniques disclosed herein may be used to identify VMs overlaid on host computers in a graphical virtual infrastructure topology, and then deploy those VMs in the host computers.

Advantageously, techniques disclosed herein automatically recognize graphical (and other) topologies in images and deploy the same. Such automated deployment may be quicker and more convenient than manual deployment, as no additional manual effort is required to enter details of a topology into, e.g., a graphical user interface or command-line interface to deploy the topology. In addition, machine learning is used in identifying software and/or hardware components as well as their properties and relationships, which may permit the topology importer to understand typical ways components, properties, and relationships are drawn in topologies. Prior to deployment, automatically recognized topologies may be also confirmed by the user and simulated to ensure correctness of the topologies.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of deploying a topology in a system, comprising:
    receiving an image depicting the topology;
    parsing the received image using one or more machine learning models which output object classifications and locations within the image;
    identifying, based on at least the object classifications and locations, at least one of software or hardware components in the topology, one or more properties of the identified components, and one or more relationships between the identified components; and
    creating instances of the identified components with the identified properties and relationships, wherein the created instances of the identified components include at least one of a logical router, a logical switch, a logical port, a virtual machine (VM), or a virtual network interface card (VNIC).

2. The method of claim 1, wherein associations between the identified one or more properties and the identified components are determined based on at least locations of object(s) representing the one or more properties relative to locations of objects representing the identified components.

3. The method of claim 2, wherein at least one of the identified properties is associated with one of the identified components based on at least an overlap between a location of object(s) representing the at least one of the identified properties and a location of an object representing the one of the identified components.

4. The method of claim 2, wherein at least one of the identified properties is associated with one of the identified components based on at least a learned relationship between a location of object(s) representing the at least one of the identified properties and a location of an object representing the one of the identified components.

5. The method of claim 1, wherein the one or more relationships between the identified components are determined based on at least one of identified links indicating connections between the identified components or locations of object(s) representing one or more of the identified components relative to object(s) representing one or more of the other identified components.

6. The method of claim 1, further comprising, training at least one of the one or more machine learning models using at least a portion of the received image.

7. The method of claim 1, further comprising, simulating instances of the identified components having the identified properties and relationships prior to creating the instances of the identified components having the identified properties and relationships.

8. The method of claim 1, wherein:
the topology is a logical network topology;
the identified at least one of software or hardware components includes at least one of a logical router, a logical switch, a logical port, a virtual machine (VM), or a virtual network interface card (VNIC);
the properties include at least one of a service enabled on one or more of the identified at least one of software or hardware components, an associated service configuration, or a configuration of one of the identified at least one of software or hardware components; and
the relationships include at least one of a connection between two of the identified components or one of the identified components belonging to another one of the identified components.

9. The method of claim 1, wherein:
the topology represents a virtualized computing system; and
the identified at least one of software or hardware components includes at least one of a datacenter, a host computer cluster, a host computer, and a virtual machine (VM).

10. The method of claim 1, wherein the image depicting the topology is a graphical image captured via a camera or a scanner.

11. The method of claim 1, further comprising, populating fields in one or more user interfaces (UIs) with information specifying one or more of the identified at least one of software or hardware components in the topology, the identified properties of the identified components, or the identified relationships between the identified components.

12. A non-transitory computer-readable storage medium containing a program which, when executed by one or more processors, performs operations for deploying a topology in a system, the operations comprising:
receiving an image depicting the topology;
parsing the received image using one or more machine learning models which output object classifications and locations within the image;
identifying, based on at least the object classifications and locations, at least one of software or hardware components in the topology, one or more properties of the identified components, and one or more relationships between the identified components; and
creating instances of the identified components with the identified properties and relationships, wherein the created instances of the identified components include at least one of a logical router, a logical switch, a logical port, a virtual machine (VM), or a virtual network interface card (VNIC).

13. The non-transitory computer-readable storage medium of claim 12, wherein associations between the identified one or more properties and the identified components are determined based on at least locations of object(s) representing the one or more properties relative to locations of objects representing the identified components.

14. The non-transitory computer-readable storage medium of claim 13, wherein at least one of the identified properties is associated with one of the identified components based on at least an overlap between a location of object(s) representing the at least one of the identified properties and a location of an object representing the one of the identified components.

15. The non-transitory computer-readable storage medium of claim 13, wherein at least one of the identified properties is associated with one of the identified components based on at least a learned relationship between a location of object(s) representing the at least one of the identified properties and a location of an object representing the one of the identified components.

16. The non-transitory computer-readable storage medium of claim 12, wherein the one or more relationships between the identified components are determined based on at least one of identified links indicating connections between the identified components or locations of object(s) representing one or more of the identified components relative to object(s) representing one or more of the other identified components.

17. The non-transitory computer-readable storage medium of claim 12, the operations further comprising, training at least one of the one or more machine learning models using at least a portion of the received image.

18. The non-transitory computer-readable storage medium of claim 12, wherein:
the topology is a logical network topology;
the identified at least one of software or hardware components includes at least one of a logical router, a logical switch, a logical port, a virtual machine (VM), or a virtual network interface card (VNIC);
the properties include at least one of a service enabled on one or more of the identified at least one of software or hardware components, an associated service configuration, or a configuration of one of the identified at least one of software or hardware components; and
the relationships include at least one of a connection between two of the identified components or one of the identified components belonging to another one of the identified components.

19. The non-transitory computer-readable storage medium of claim 12, the operations further comprising, populating fields in one or more user interfaces (UIs) with information specifying one or more of the identified at least one of software or hardware components in the topology, the identified properties of the identified components, or the identified relationships between the identified components.

20. A system, comprising:
a processor; and
a memory, wherein the memory includes a program executable in the processor to perform operations for automatically deploying a topology in a system, the operations comprising:
receiving an image depicting the topology,
parsing the received image using one or more machine learning models which output object classifications and locations within the image,
identifying, based on at least the object classifications and locations, at least one of software or hardware components in the topology, one or more properties of the identified components, and one or more relationships between the identified components, and
creating instances of the identified components with the identified properties and relationships, wherein the created instances of the identified components include at least one of a logical router, a logical switch, a logical port, a virtual machine (VM), or a virtual network interface card (VNIC).

\* \* \* \* \*